Jan. 20, 1953   G. C. DREHER   2,625,858
MOUTH MIRROR
Filed June 1, 1950
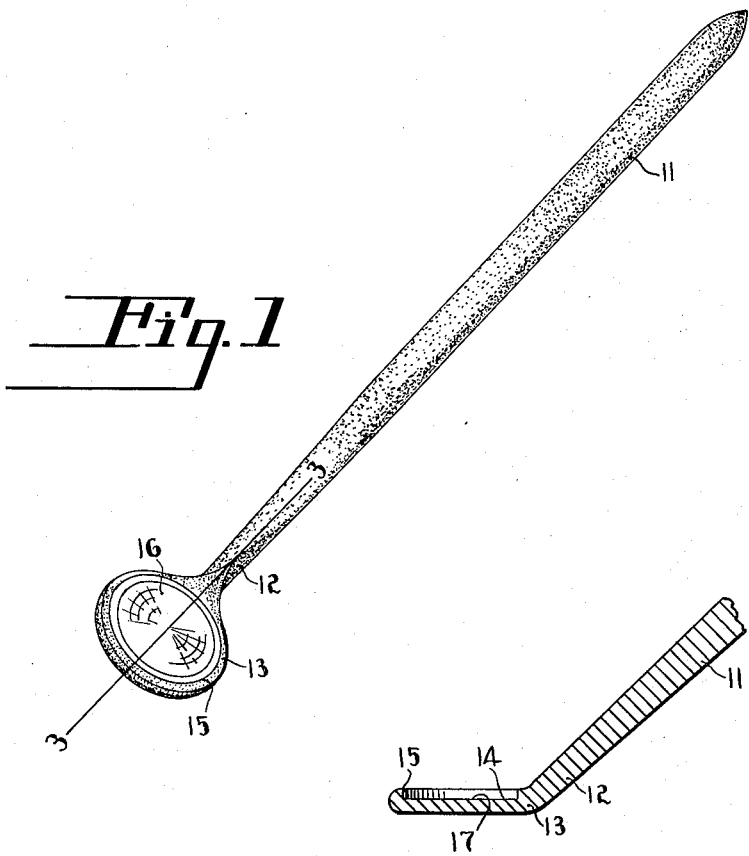
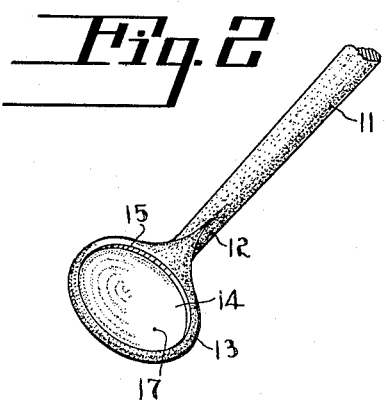
INVENTOR.
GEORGE C. DREHER
BY Norman N. Popper
ATTORNEY.

Patented Jan. 20, 1953

2,625,858

UNITED STATES PATENT OFFICE 2,625,858

MOUTH MIRROR

George C. Dreher, Short Hills, N. J.

Application June 1, 1950, Serial No. 165,516

1 Claim. (Cl. 88—104)

My invention relates generally to mouth mirrors and specifically to mouth mirrors that are resistant to clouding or fogging by the condensation of moisture on the mirror surfaces thereof.

It is among the objects of my invention to provide a mouth mirror having a reflecting surface which will tend to maintain itself in ordinary use in intimate heat exchange relationship with the hand of the person holding it.

It is a further object of my invention to provide a mouth mirror whose reflecting surface will have the least tendency to condense moisture thereon during ordinary usage, in the oral cavity of the human body.

It is a further object of my invention to provide a mouth mirror which is simple in form, relatively inexpensive, durable and convenient to use.

These objects and advantages, as well as other objects and advantages, are attained by the device illustrated in the drawings in which:

Figure 1 is a front view of my mouth mirror;

Figure 2 is a partial front view of my mouth mirror, with the mirror glass removed; and Figure 3 is a cross section taken on the lines 3—3 in Figure 1.

Referring now to the drawings in detail, my mouth mirror has a handle 11. This handle is preferably cylindrical in form. It is made of a material having a high index of thermal-conductivity such as copper, silver, aluminum or various alloys. While the cross sectional dimensions of this handle are not critical, it is nevertheless desirable to indicate that it shall not have the proportions of a fine wire, but rather the cross sectional dimensions of approximately that of the ordinary pencil, for the handle is intended to transmit the body heat from the hand of the person using it. It has been found that the handle works well when its width is approximately one-quarter the diameter of the mirror. In order that the heat exchange may proceed in an efficient manner, the cross section of the handle shall be uniform throughout. At the lower end 12 of the handle, there is formed integral therewith a widened portion 13. This widened portion is somewhat spatulate in form, in that it is disposed at an angle to the axis of the handle as will appear from Figure 3, and in that it is somewhat flattened. This widened portion of the handle is preferably circular in form. In the center of the widened portion 13, there is a recess 14, which may be circular in form and adapted to receive the ordinary circular disc mirror used in mouth mirrors. The recess will have an upstanding flange 15 surrounding it, which flange serves to position the mirror and protect its edges, as well as to provide a means for sealing the edge of the mirror to the extended portion so that saliva from the mouth may not enter under the mirror glass and impair the mirror finish. A small mirror 16 is positioned in this recess. Such mirror is preferably circular in form and may be secured in the recess in any desired manner, such as by cementing it in place by a seal applied around the edges or by bending over the flange so that it encompasses the edge of the mirror.

The bottom 17 is substantially flat, so that the back of the mirror 16 will be in close contact with it over its entire area, thereby setting up an intimate heat exchange relationship between the mirror and the widened portion of the handle. Since such mirrors are usually backed with a metallic silver coating with a possible overlay of copper, good heat exchange is reasonably assured, particularly if the method of attaching the mirror in the recess is to firmly seat it with its back against the bottom 17 and then apply a suitable adhesive or cement around the outer edge where the edge of the mirror most closely approaches the flange 15.

In use, the body heat of the person grasping the handle of the mirror, modifies the native temperature of the handle. Since the handle has a high coefficient of thermal-conduction, its temperature characteristics are communicated to the mirror. Thus the effect of the use of my mirror is to elevate the dew point when the mirror is intruded in the oral cavity. Condensation of the moisture in the exhalate is inhibited to the extent that the dew point is raised. The inspection of the oral cavity proceeds without the necessity for wiping moisture off of the mirror at frequent intervals.

It may be desired that at the point where the widened portion 13 of the handle 11 branches out, that joints of various characters may be provided so that the mirror section itself may be disjointed from the balance of the handle. This will in no wise impair the functioning of my device, provided that there is a rather full contact between the two sections after the joints are fully engaged with each other.

The foregoing description is intended merely as an embodiment of one form of my invention, for many changes may be made in the construc-

I claim:

A mouth mirror comprising an elongated cylindrical handle formed of material having a high coefficient of thermal conduction and being of substantially uniform cross-section along its longitudinal axis, an integral disc-shaped portion formed at one end of the handle and disposed at an acute angle thereto, said portion having a recess formed in one face thereof which recess is not greater than approximately four times the diameter of the handle, said recess defining a flat seat for a mirror, a mirror having a flat back positioned in the recess with its back in intimate contact with the bottom of the recess and in intimate heat exchange relationship between the said mirror and the disc-shaped portion, and a flange surrounding the recess in peripheral contact with the front of the mirror and maintaining the back of the mirror in contact with the bottom of the recess.

GEORGE C. DREHER.

REFERENCES CITED

The following references are of record in the file of this patent:

UNITED STATES PATENTS

| Number | Name | Date |
|---|---|---|
| 528,163 | Hitchcock | Oct. 30, 1894 |
| 539,076 | McNaughton | May 14, 1895 |
| 1,722,748 | Holden | July 30, 1929 |
| 1,843,067 | De Terra | Jan. 26, 1932 |
| 1,934,110 | Wilson | Nov. 7, 1933 |